United States Patent
Hartman et al.

(10) Patent No.: US 7,117,484 B2
(45) Date of Patent: Oct. 3, 2006

(54) RECURSIVE USE OF MODEL BASED TEST GENERATION FOR MIDDLEWARE VALIDATION

(75) Inventors: Alan Hartman, Haifa (IL); Kenneth Nagin, D.N. Nazareth Ilit (IL); Guy Sharon, Rehovot (IL)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 10/122,427

(22) Filed: Apr. 16, 2002

(65) Prior Publication Data

US 2003/0196191 A1 Oct. 16, 2003

(51) Int. Cl.
*G06F 9/44* (2006.01)
*G06F 9/45* (2006.01)

(52) U.S. Cl. ............... 717/126; 717/104; 717/105; 717/124

(58) Field of Classification Search ........ 717/124–136, 717/100, 104–105; 703/21–23; 714/38; 716/2
See application file for complete search history.

(56) References Cited

U.S. PATENT DOCUMENTS

| | | | | |
|---|---|---|---|---|
| 5,475,843 A * | 12/1995 | Halviatti et al. | ............ | 717/124 |
| 5,590,331 A * | 12/1996 | Lewis et al. | ............... | 717/144 |
| 5,892,947 A * | 4/1999 | DeLong et al. | ............ | 717/100 |
| 5,918,037 A * | 6/1999 | Tremblay et al. | ............... | 716/2 |
| 5,950,004 A * | 9/1999 | Bearse et al. | ............... | 717/146 |
| 6,006,028 A * | 12/1999 | Aharon et al. | ............... | 703/21 |
| 6,148,277 A * | 11/2000 | Asava et al. | ................. | 703/22 |
| 6,152,612 A * | 11/2000 | Liao et al. | .................... | 703/23 |
| 6,275,976 B1 * | 8/2001 | Scandura | .................... | 717/120 |
| 6,279,124 B1 * | 8/2001 | Brouwer et al. | ............. | 714/38 |
| 6,343,372 B1 * | 1/2002 | Felty et al. | ................. | 717/136 |
| 6,353,896 B1 * | 3/2002 | Holzmann et al. | ............ | 714/38 |
| 6,421,634 B1 * | 7/2002 | Dearth et al. | ................. | 703/14 |
| 6,698,012 B1 * | 2/2004 | Kossatchev et al. | ........ | 717/126 |
| 6,779,135 B1 * | 8/2004 | Ur et al. | ....................... | 714/38 |
| 2002/0026633 A1 * | 2/2002 | Koizumi et al. | ............ | 717/146 |
| 2002/0100022 A1 * | 7/2002 | Holzmann | .................. | 717/126 |
| 2002/0162091 A1 * | 10/2002 | Crocker | ....................... | 717/126 |
| 2003/0014734 A1 * | 1/2003 | Hartman et al. | ............ | 717/125 |
| 2003/0028856 A1 * | 2/2003 | Apuzzo et al. | ............. | 717/124 |
| 2003/0046613 A1 * | 3/2003 | Farchi et al. | ................. | 714/38 |
| 2003/0097650 A1 * | 5/2003 | Bahrs et al. | ................ | 717/124 |

OTHER PUBLICATIONS

Weber et al., Automated validation test generation, IEEE, Oct.-Nov. 3, 1994 pp. 99-104.*

(Continued)

*Primary Examiner*—Wei Zhen
*Assistant Examiner*—Satish S. Rampuria
(74) *Attorney, Agent, or Firm*—Browdy and Neimark, PLLC

(57) ABSTRACT

Middleware is validated using a two layered modeling strategy for the generation of test suites. A high level model of the syntax of the programming language used to program the middleware generates a series of high level abstract programs. These high level abstract programs then undergo two separate translations. First they are translated directly into actual test programs, which are expressed in the programming language of the middleware. Second, they are translated into second models of the high level abstract programs. Running the model based test generator again on the second models produces a set of suites of test cases, each test case consisting of data inputs and predicted results for one of the actual test programs. The actual test programs are run repetitively using the middleware execution engine. The results are compared with the predicted results, using a generic validation engine.

36 Claims, 5 Drawing Sheets

OTHER PUBLICATIONS

Dintelman, A perspective of the generator testing and model validation program in WSCC, IEEE, vol. 1, Jan. 31-Feb. 4, 1999 pp. 157-159.*

Netisopakul et al., Data coverage testing of programs for container classes, IEEE, Nov. 12-15, 2002 pp. 183-194.*

Cyre, Conceptual modeling and simulation, IEEE, 1999, pp. 293-296.*

Apfelbaum et al., Model Based Testing, Google.com; May 1997, pp. 1-14.*

El-Far et al., Model-based Software Testing, http://www.geocities.com/model_based_testing/ModelBasedSoftwareTesting.pdf, 2001, p. 1-22.*

Dalal et al., Model-Based Testing in Practice, May 1999 (ACM Press), p. 1-10.*

Goswami et al., Simulation of software behavior under hardware faults, IEEE, Jun. 1993 pp. 218-227.*

Gulla et al., Executing, viewing and explaining conceptual models, IEEE, Apr. 1994 pp. 166-175.*

Jacobs et al., Towards a metrics based verification and validation maturity model, IEEE, Oct. 2002 pp. 123-128.*

Y. Lichtenstein et al, "Model-Based Test Generation for Process Design Verification", Sixth Innovative Applications of Artificial Intelligence Conference, Aug. 1994, pp. 83-94.

A. Chandra, et al. "AVPGEN—A Generator for Architecture Verification", Test Cases, IEEE Trans. Very Large Scale Integration (VLSI) systems vol. 3, No. 2, 188-200, Jun. 1995.

* cited by examiner

RECURSIVE USE OF MODEL BASED TEST GENERATION FOR MIDDLEWARE VALIDATION

REFERENCE TO COMPUTER PROGRAM LISTING APPENDIX

Computer program listing appendices are submitted herewith on one compact disc and one duplicate compact disc. The total number of compact discs including duplicates is two. The files on the compact discs are ASCII text files in which the characters are displayed as their corresponding values in hexadecimal format. Their names, dates of creation, directory locations, and sizes in bytes are:

Directory "appendix" containing file "42365.HEX", created Feb. 14, 2002, and of length 28,438 bytes.

The material on the compact discs is incorporated by reference herein.

BACKGROUND OF THE INVENTION

1. Field of the Invention

This invention relates to software testing. More particularly this invention relates to model based automatic generation of test programs for the validation of middleware.

2. Description of the Related Art

Middleware is software that functions as a conversion or translation layer between applications or between an application and the operating system. Middleware solutions have been developed in order to enable applications to communicate with other applications. The applications may execute on different platforms, be produced by different vendors or both. Today, there is a diverse group of products that offer packaged middleware solutions. One of the characteristics of middleware is that its software is "programmable". In other words, the user can program the middleware to behave in a number of different ways.

Traditional software testing involves study of the software system by the tester, who then writes and executes individual test scenarios that exercise the software being tested. In the case of middleware, testing typically requires validation of many functional levels, which increases the complexity of the task. Test software for a middleware system is itself an application which needs to be tested.

More recent model-based approaches to test generation have common problems that this invention builds upon. In each case, the number of unique paths, or generated test programs is an exponential function of the number of modeled states and transitions. Thus, as the scope of the modeled behavior grows, the time to exhaustively generate test cases, and more significantly, the time needed to execute the generated test cases grows exponentially. This growth places a practical limit on the complexity of the program behavior to which automated model-based test generation can be applied. The invention focuses and therefore reduces the number of tests to a practical level. In so doing, the invention raises the practical limit on the complexity of the software program to which automated model-based test generation may be applied.

Conventional testing of established types of middleware involves the use of benchmark sets of input programs. These programs are seldom run with real input data. Instead, the output of the middleware, for example a compiler, is compared with the results of other compilers for the same input code. This testing methodology is inappropriate for new products, for which there are no benchmarks, and for which there is no comparable middleware to evaluate the test.

Typical of conventional approaches for generating test programs from a model is U.S. Pat. No. 5,394,347 to Kita et al. which discloses a method of modeling a specification as an extended finite state machine, then performing a depth-first traversal of the resulting state diagram to generate a path file as a basis for a test program.

In U.S. Pat. No. 5,918,037 to Tremblay et al., it is proposed to employ a test generator that automatically produces test programs based on a finite state machine model of the software. Limiting the number of test programs is achieved by controlling loop execution, and by appropriately setting the coverage level for the model, known as "transition cover testing". This approach seeks to specify during the test program generation process that each transition within the finite state machine model be exercised once. The generator is capable of specifying different coverage levels for selected portions of the program under test, so that critical portions might be exhaustively tested, while other portions receive less comprehensive testing.

During the past decade, model-based random test program generators have become popular in processor architectural design verification and software testing. An example of such a random test generators include the IBM tool, "Genesys", which is disclosed in the document *Model-Based Test Generation for Process Design Verification*, Y. Lichtenstein et al., Sixth Innovative Applications of Artificial Intelligence Conference, August 1994, pp. 83–94.

Another conventional test generator, AVPGEN, is disclosed in the document *AVPGEN—A Generator for Architecture Verification Test Cases*, A. Chandra, et al. IEEE Trans. Very Large Scale Integration (VLSI) Syst. 3, No. 2, 188–200 (June 1995).

None of the techniques disclosed in the above noted documents is well suited for solving the particular issues presented by middleware.

SUMMARY OF THE INVENTION

It is a primary advantage of some aspects of the present invention that large portions of the task of validating middleware systems are automated.

It is another advantage of some aspects of the present invention that a systematic approach to the validation of complex middleware is provided.

It is a further advantage of some aspects of the present invention that through the use of a plurality of automatically generated abstract models, a more effective technique for testing complex middleware is provided.

These and other advantages of the present invention are attained by a two layered modeling strategy for the generation of test suites for middleware systems. Initially a high level model of the syntax of the programming language used to program the middleware is submitted to a model based test generator, which generates a series of high level abstract programs, structured according to the high level model. These high level abstract programs then undergo two separate translations. First, they are each translated directly into the programming language of the middleware, creating a suite of actual test programs, or meta-data for the middleware. These test programs define the behavior, which the middleware must exhibit on the receipt of stimuli from a user or the external environment. Second, the high level abstract programs are translated into a suite of models of the high level abstract programs. Running the model based test generator again on the second models, using the same syntax as before, produces a set of suites of test cases, each suite of test cases providing input to a corresponding actual test program. The test cases consist of data inputs and predicted results, based on the high level abstract programs. The actual test programs are then repetitively executed by an execution engine, each actual test program applying its corresponding suite of test cases. The results of this execution are compared with the expected results for the test cases. This is accomplished using a generic validation engine, which need not have knowledge of the middleware itself, and thus can he reused in the testing of other components.

The invention provides a method of validating a computer application, which includes generating an abstract program in accordance with syntactic requirements of a computer application being validated, performing a first translation of the abstract program into meta-data that is an acceptable input for the computer application, performing a second translation of the abstract program into a behavioral model of the abstract program, and generating a test case from the behavioral model. The test case includes data and predicted results. The method includes stimulating the computer application with the meta-data and the data, observing actual results produced by the computer application, and comparing the actual results with the predicted results.

In an aspect of the method, the second translation of the abstract program includes automatically generating a coverage criterion for the test case. The test case can be a plurality of test cases, and the meta-data can be a plurality of test programs. The behavioral model can be a plurality of behavioral models.

According to an additional aspect of the method, the meta-data is expressed in a first language, and the behavioral model is expressed in a second language.

According to aspects of the method, the syntactic requirements include any of an event definition, a lifespan definition, and a situation definition.

According to yet another aspect of the method, the abstract program includes a plurality of situations.

In still another aspect of the method the first translation is performed using a translation table.

According to an additional aspect of the method, the behavioral model includes a state variable.

According to one aspect of the method, the behavioral model includes a suite of behavioral models and a common set of rules.

According to another aspect of the method, the test case includes a sequence of events.

According to a further aspect of the method, the test case also includes an indicator of a passage of time.

The invention provides a computer software product, including a computer-readable medium in which computer program instructions are stored, which instructions, when read by a computer, cause the computer to perform a method of validating a computer application, which includes generating an abstract program in accordance with syntactic requirements of a computer application being validated, performing a first translation of the abstract program into meta-data that is an acceptable input for the computer application, performing a second translation of the abstract program into a behavioral model of the abstract program, and generating a test case from the behavioral model. The test case includes data and predicted results. The method includes stimulating the computer application with the meta-data and the data, observing actual results produced by the computer application, and comparing the actual results with the predicted results.

The invention provides a method of validating middleware, which includes generating an abstract program in accordance with syntactic requirements of a computer application being validated, performing a first translation of the abstract program into meta-data that is an acceptable input for the computer application, performing a second translation of the abstract program into a behavioral model of the abstract program, and generating a test case from the behavioral model. The test case includes data and predicted results. The method includes stimulating the computer application with the meta-data and the data, observing actual results produced by the computer application, and comparing the actual results with the predicted results.

The invention provides a computer software product, including a computer-readable medium in which computer program instructions are stored, which instructions, when read by a computer, cause the computer to perform a method of validating middleware, which includes generating an abstract program in accordance with syntactic requirements of a computer application being validated, performing a first translation of the abstract program into meta-data that is an acceptable input for the computer application, performing a second translation of the abstract program into a behavioral model of the abstract program, and generating a test case from the behavioral model. The test case includes data and predicted results. The method includes stimulating the computer application with the meta-data and the data, observing actual results produced by the computer application, and comparing the actual results with the predicted results.

The invention provides an apparatus for validating a computer application, including a test generator for generating an abstract program in accordance with syntactic requirements of a computer application being validated, a translation module for performing a first translation of the abstract program into meta-data that is an acceptable input for the computer application, and for performing a second translation of the abstract program into a behavioral model of the abstract program. The test generator is adapted for generating a test case from the behavioral model. The test case includes data and predicted results. The apparatus has an execution engine for stimulating the computer application with the meta-data and the data, and for observing actual results produced by the computer application, and a validation engine for comparing the actual results with the predicted results.

The invention provides an apparatus for validating middleware, including a test generator for generating an abstract program in accordance with syntactic requirements of a computer application being validated, a translation module for performing a first translation of the abstract program into meta-data that is an acceptable input for the computer application, and for performing a second translation of the abstract program into a behavioral model of the abstract program. The test generator is adapted for generating a test case from the behavioral model. The test case includes data and predicted results. The apparatus has an execution engine for stimulating the computer application with instructions of the meta-data and the data, and for observing actual results produced by the computer application, and a validation engine for comparing the actual results with the predicted results.

BRIEF DESCRIPTION OF THE DRAWINGS

For a better understanding of these and other objects of the present invention, reference is made to the detailed description of the invention, by way of example, which is to be read in conjunction with the following drawings, wherein:

FIG. 5 is a computer screen display illustrating predicted results of test cases suites in accordance with a preferred embodiment of the invention.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and distributing software code via networks are well known and will not be further discussed herein.

The disclosure herein is explained with reference to middleware, which is an important exemplary application of the invention. However the invention is not limited to middleware, and can be employed for the validation of many different types of software.

Figure 1:
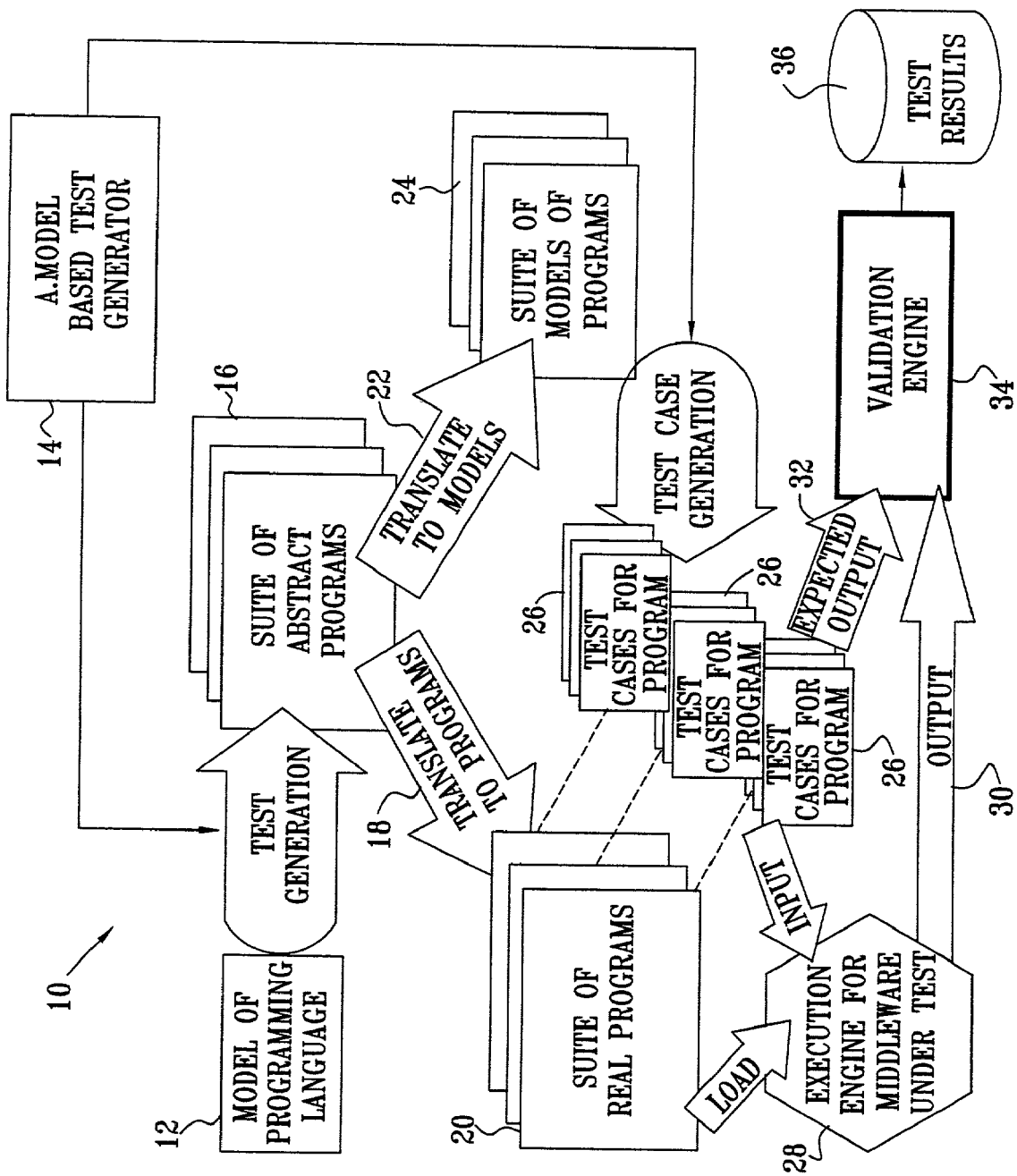
FIG. 1 is a block diagram illustrating an arrangement for model based middleware validation in accordance with a preferred embodiment of the invention.

Turning now to the drawings, reference is made to FIG. 1, which is a high level block diagram illustrating an arrangement 10 for model based middleware validation that is constructed and operative in accordance with a preferred embodiment of the invention. The syntactic requirements, or language syntax applicable to a middleware application are represented as a syntax model 12. The syntax model 12 is processed by a model based test generator 14, which outputs a suite of abstract programs 16. The abstract programs 16 undergo two separate translations. In a first translation, represented by an arrow 18 they are each translated directly into programs expressed in the programming language of the middleware, creating a suite of test programs 20. The test programs 20 are thus meta-data for the middleware. In a second translation, represented by an arrow 22, the abstract programs 16 are translated into a suite of behavioral models 24 of the abstract programs 16, which describe the behavior of the middleware application. The behavioral models also contain goals and purposes of the tests, which are generated automatically.

The behavioral models 24 are operated upon by the test generator 14, and a plurality of test case suites 26 are generated, one for each one of the behavioral models 24. The test cases of each of the test case suites 26 consist of data inputs and predicted results for a particular one of the behavioral models 24.

The test programs 20 are repetitively executed by an execution engine 28 for the middleware being validated, using corresponding test case suites 26 as input. This produces an output 30, which is a stream of actual test results.

The predicted results, or expected output 32 of the test case suites 26 and the output 30 of the execution engine 28 are both submitted to a validation engine 34 for comparison. The results of the comparisons are provided as a series of test results 36.

Figure 2:
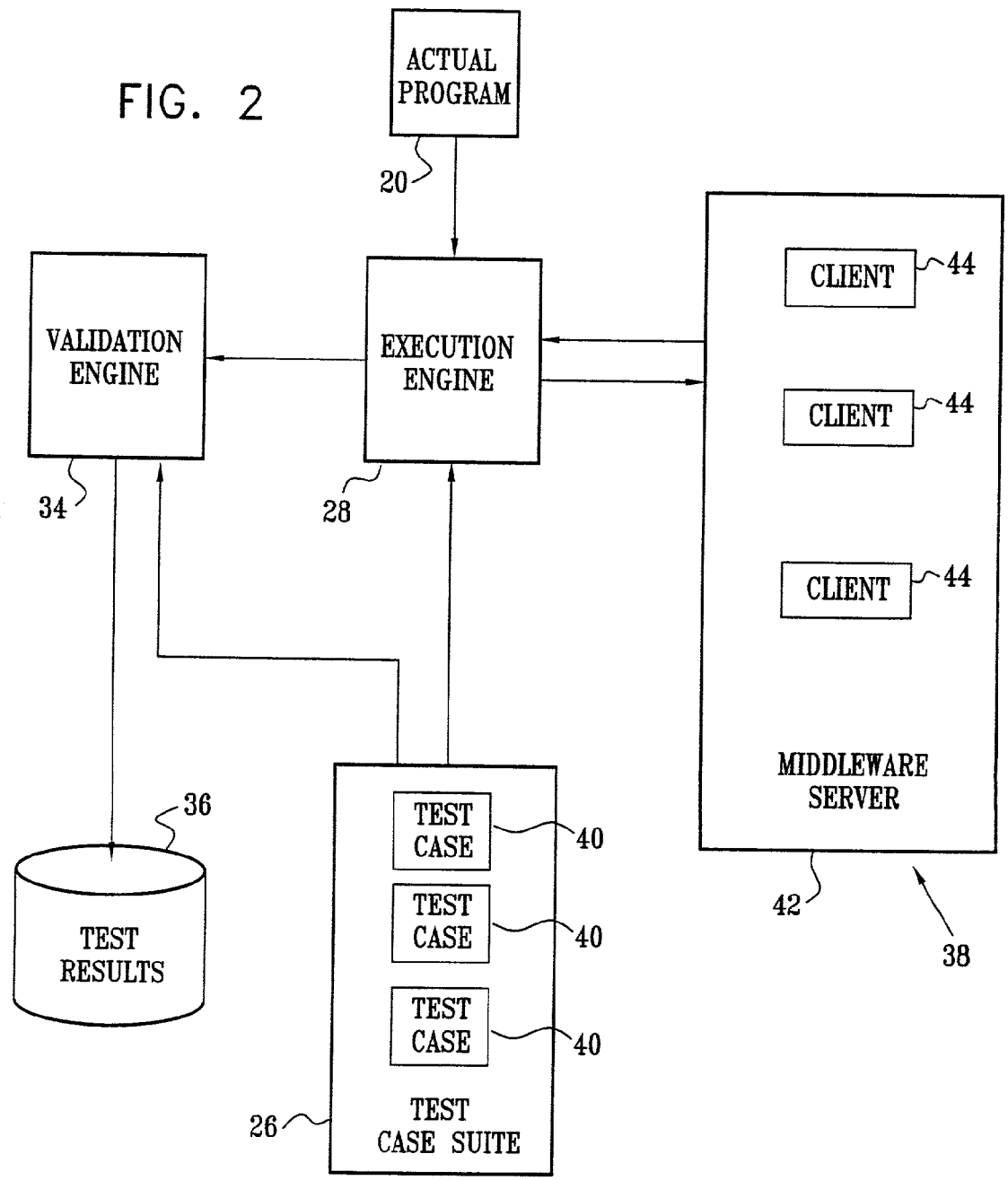
FIG. 2 is a block diagram illustrating in further detail the execution engine, and the validation engine, which are used in the arrangement shown in FIG. 1.

Reference is now made to FIG. 2, which is a block diagram illustrating in further detail the execution engine 28, the validation engine 34, and a middleware system 38 being validated in accordance with a preferred embodiment of the invention. The description of FIG. 2 should be read in conjunction with FIG. 1. The execution engine 28 is initially programmed with one of the test programs 20. One of the test case suites 26, specifically prepared for the test program, and having a plurality of test cases 40, provides a second input to the execution engine 28. The middleware system 38 is represented by a server application 42 having a plurality of clients 44. As explained above, the middleware system 38 could be any form of middleware, and could be non-traditional middleware, such as a hardware synthesizer. In addition to providing input for the execution engine 28, the test cases 40 include expected results of the execution of the test case by the execution engine 28. These expected results are provided to the validation engine 34. The output of the validation engine 34 is logged as test results 36.

Figure 3:
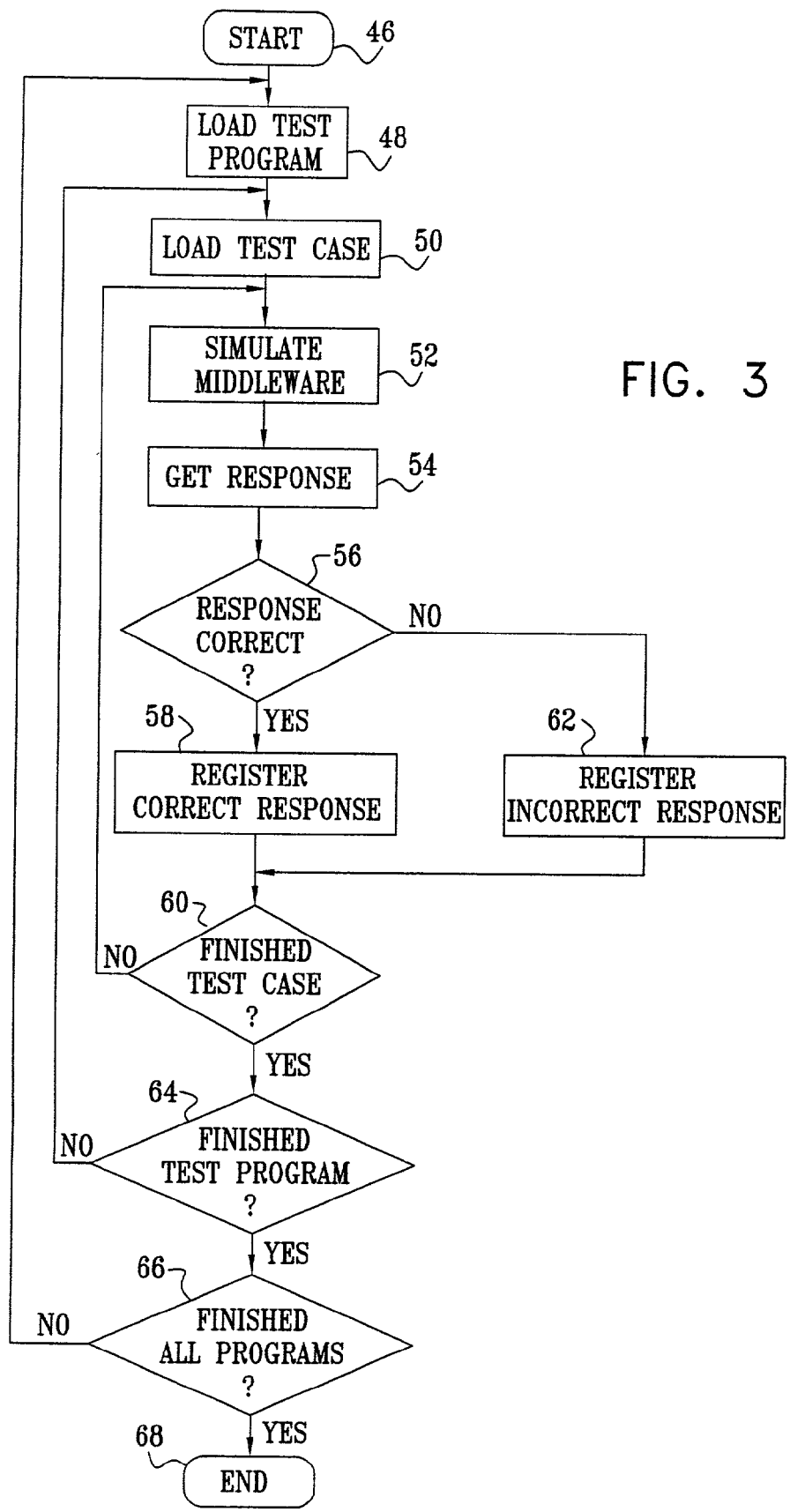
FIG. 3 is a flow diagram describing a typical cycle of operation of the arrangement shown in FIG. 2 in accordance with a preferred embodiment of the invention.

Reference is now made to FIG. 3, which is a flow diagram describing a typical cycle of operation of the arrangement shown in FIG. 2. The description of FIG. 3 should be read in conjunction with FIG. 1. The process begins at initial step 46, and control immediately passes to step 48, where one of the test programs 20 is loaded into the execution engine 28. As explained above, the test program is expressed in a language that is acceptable input for the middleware system 38. Next, at step 50 one of the test cases 40 is introduced into the execution engine 28, for use by the test program. It will be recalled that the test cases 40 include expected results of the execution of the test program. These expected results are input to the validation engine 34.

Next, at step 52, the execution engine 28 stimulates the middleware system 38 by issuing an instruction of the current test program.

The middleware system 38 processes the instruction that was issued in step 52. At step 54, a response to the instruction is observed by the execution engine 28. This response is communicated to the validation engine 34.

Control now passes to decision step 56, where the validation engine 34 determines whether the response received in step 54 corresponds to the expected response that it was provided in step 50.

If the determination at decision step 56 is affirmative, then control proceeds to step 58, where it concluded that no design defect has been demonstrated in the middleware system 38 as to the current instruction. A record of the correct response is output to the test results 36. If the middleware system 38 is an event driven application, it may be that no response is appropriate, if the current instruction does not fully provide the triggering conditions of an event. Control now passes to decision step 60, which is disclosed below.

If the determination at decision step 56 is negative, then control proceeds to step 62, where it is concluded that a design defect may exist in the middleware system 38. A record of the incorrect response is output to the test results 36. Control now passes to decision step 60.

At decision step 60 a determination is made whether the current test case has been completed. If the determination at decision step 60 is negative, then control returns to step 52.

If the determination at decision step 60 is affirmative, then control proceeds to decision step 64, where it is determined if the current test program has been fully executed. If the determination at decision step 64 is negative, then control returns to step 50.

If the determination at decision step 64 is affirmative, then control proceeds to decision step 66, where it is determined if all test programs have been executed. If the determination at decision step 66 is negative, then control returns to step 48.

If the determination at decision step 66 is affirmative, then control proceeds to final step 68, and the process ends.

EXAMPLE

Continuing to refer to FIG. 1, in this example the components of the arrangement 10 are described in further detail with reference to a subset of a generic active middleware technology application, herein referred to as "SAMIT". SAMIT is a programmable system for monitoring and reacting to events that occur in a network or database. It will be understood that the application SAMIT is selected merely for explication of the invention, and that the invention herein is not limited to SAMIT.

SAMIT Syntax.

In this example, the syntax model 12 employs the following SAMIT syntax to produce an input to the test generator 14. The syntax consists of one or more event definitions, one or more lifespan definitions, and one or more situation definitions.

Each event definition contains a unique event name, and zero or more event attribute names and their respective types, as shown in the exemplary event definition of Listing 1, shown below.

Each lifespan definition contains a unique lifespan name, an initiator, which is either the keyword "startup" or an event identifier "event id". If the initiator is not the key word startup, then a qualifier involving the attributes of the initiator may also be given. The lifespan definition also includes a terminator, which is one of the following: the key word "forever"; an expiration interval representing the number of milliseconds after the initiator; and an event id, which may be qualified by a Boolean expression "where".

Listing 2 is an exemplary lifespan definition. The lifespan begins at system startup and finishes after 2000 milliseconds.

In another exemplary lifespan definition, shown in Listing 3, the lifespan starts when the percentage attribute of an event "event1", is equal to 50, and is terminated by an unqualified occurrence of another event "event2".

Situations can be of several types. In one type, the report situation, there are a unique situation name, a lifespan, and a situation operator, which in this case is the operator "report", qualified by a detection mode. The detection mode may be either the mode "immediate" or the mode "delayed". Here the term delayed means a delay lasting until the end of the lifespan.

Report situations further include zero or more situation attributes. Each situation attribute has a name, a type, and an expression. The expression is to be reported when the situation occurs. Report situations further include a notification directive, "notify", which can have either the value "immediate" or the value "delayed".

In an exemplary report situation, given in Listing 4, the situation "sitSimple1" causes SAMIT to emit the message "sitSimple1 occurred at time xx:yy" at the end of a lifespan defined by "life2", provided that the percentage attribute of event1 is equal to that of event2.

More complex situations have other operators. Examples are given in Listing 5, Listing 6 and Listing 7 of situations defined using the operators "not", "atMost", and "sequence", respectively.

In Listing 5, the message "sitNot1 occurred at time xx:yy" appears whenever the percentage attribute of the event "event1" fails to equal 75 within the lifespan "life1".

The code of Listing 6 produces the message "sitAtmost occurred at time xx:yy", when two or fewer occurrences of the event "event3" take place during the lifespan "life3", and where those events satisfy the where condition. The where condition is satisfied when the percentage attribute of the event event3 is between the percentages of the initiating and terminating percentages of the lifespan life3.

The code of Listing 7 produces the message "sitSeq1 occurred at time xx:yy", when the event "event3" occurs after the event "event1" within the lifespan "life4", and the percentage attribute of the event event1 is the same as the percentage of the initiating event of the lifespan.

The syntax model 12 (FIG. 1), is realized by a model of the SAMIT syntax described above, as shown in Listing 8. The code of Listing 8 generates both correct and incorrect SAMIT programs as test cases.

Abstract Programs.

Continuing to refer to FIG. 1, the suite of abstract programs 16 generated by the syntax model 12 consists of a set of test cases, each of which has three syntactically correct situations, and zero or more syntactically incorrect situations. A sample test case is presented in Listing 9. The syntactically correct situations are MakeNotOperatorSituation, MakeSimpleSituation, and MakeBinaryOperatorSituation. The syntactically incorrect situation is MakeCountSituation, which contains the initiator "startup", which is inappropriately qualified by the qualifier "equal_tiq". Each abstract program also includes three events.

Actual Test Programs.

Continuing to refer to FIG. 1, the test programs 20 are produced using the abstract programs 16, as explained above. Any lifespan that is defined in an abstract program is added to the output, followed by the situations that are defined in the abstract program. The abstract program of Listing 9 produces input for SAMIT that is shown in Listing 10.

The translation to SAMIT-compatible input is automatically accomplished, using a translation table to translate the language of the abstract program to SAMIT input syntax. Such a translation table can be created with straightforward known programming techniques.

The third step of the abstract program of Listing 9 contains a SAMIT syntax error, which should be detected when loading SAMIT with the input of Listing 10, before any events are received.

Behavioral Models.

Continuing to refer to FIG. 1, the abstract programs 16 are translated into behavioral models 24. Listing 11 shows a behavioral model that corresponds to the abstract program of Listing 9.

Each behavioral model begins with a common header, describing the state variables, constants and types common to all the behavioral models and abstract programs. The main state variables are the two arrays SituationOpened and SituationReported. State variables and constants are declared for each of the three valid situations in the abstract program. The situation of Listing 9 having invalid syntax is not translated.

When a situation has a time dependency in its lifespan, it declares a timer variable. State variables are also declared for situations, other than the simplest situations, in order to track their progress.

Each situation is analyzed to create a procedure for simulating SAMIT behavior. When the situation has timing issues, the procedure contains a piece of code to track the timing state variable. The procedure then continues with code for updating the SituationOpened and SituationReported variables as appropriate.

Finally, a common set of rules and coverage criteria are given, which is common to all models in the test suite. The coverage criteria are automatically generated, without need for intervention by the user, as can be appreciated, for example by the statements CC_State_Projection TRUE On SituationReported;
CC_State_Projection TRUE On SituationOpened;

which appear at the end of Listing 11.

Translation of the abstract program to a behavioral model is automatic, after the user constructs a translation table from the language of the abstract program to the behavioral modeling language. Such a translation table can be routinely created using known programming techniques.

Test Cases.

Referring again to FIG. 1 and FIG. 2, test case suites 26 are produced by applying the test generator 14 to the abstract programs 16. Each of the test cases 40 (FIG. 2) is a sequence of events and time passage. The behavioral models 24 predict the response of SAMIT to the three situations defined in each test case. This prediction is an important aspect of the invention, and a basis for verifying the design of the middleware system 38.

Figure 4:
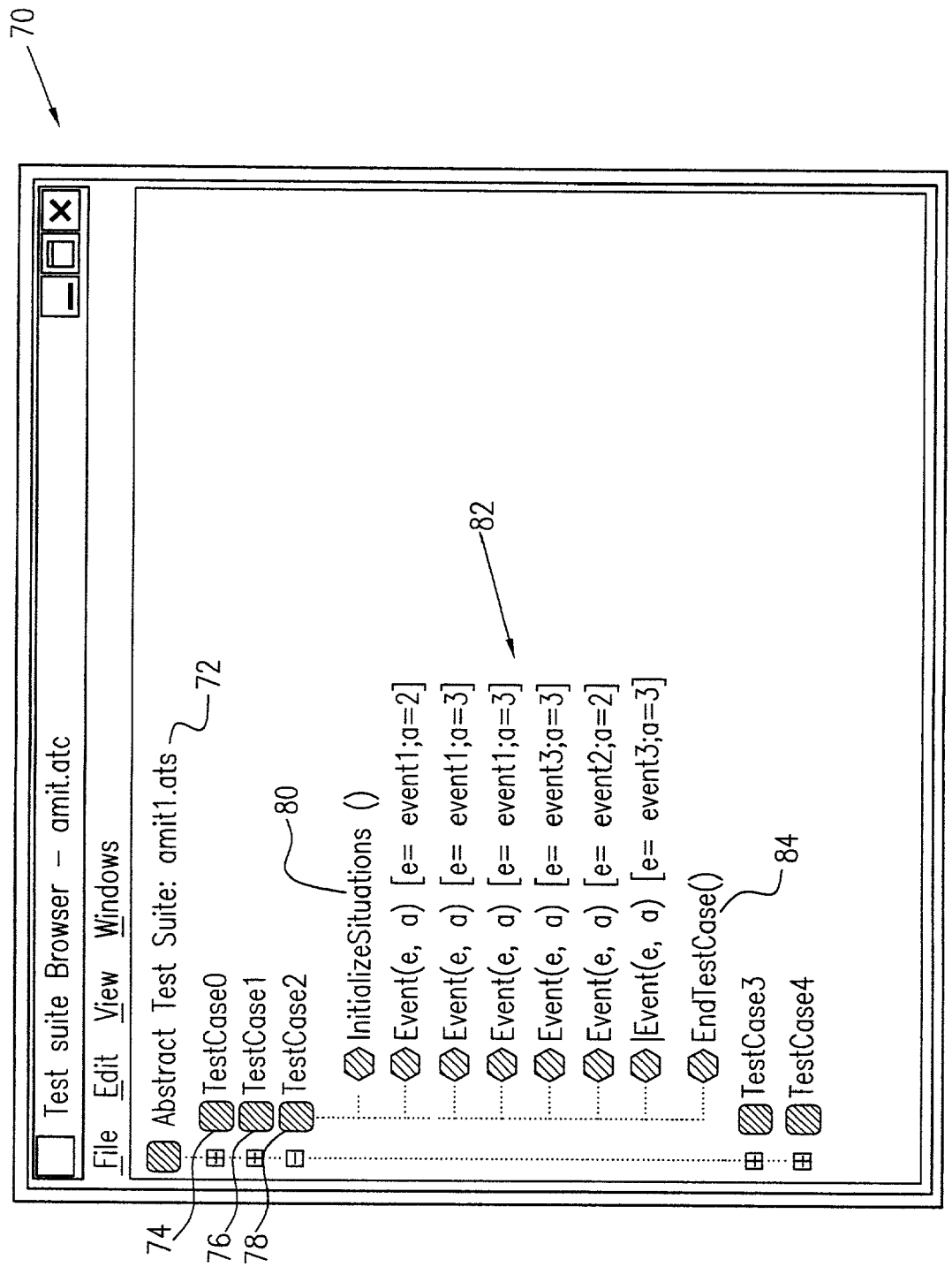
FIG. 4 is a computer screen display illustrating test cases suites produced by the arrangement shown in FIG. 1, in accordance with a preferred embodiment of the invention.

Reference is now made to FIG. 4, which is a computer screen display illustrating test cases suites in accordance with a preferred embodiment of the invention. A screen display 70, created by a conventional browser or XML viewer, presents the result of applying the test generator 14 (FIG. 1) to the behavioral model shown in Listing 11.

The screen display 70 displays a test case suite 72, which is actually one of the test case suites 26 (FIG. 1). A first level expansion of the test case suite 72 presents test cases 74, 76, 78, which correspond to the test cases 40 (FIG. 2). A second level expansion of the test case 78 presents a reference to a procedure 80, which consists of initializing instructions, following the declaration 'TC_StartTestCase "InitializeSituations( )"' of Listing 11.

The procedure 80 is followed by a series of data 82, which are used to stimulate the middleware system 38. The data 82 each consist of an event, and an attribute of the event. The test case 78 ends with a procedure 84, which is shown in detail following the declaration 'TC_EndTestCase "EndTestCase( )"' in Listing 11.

Figure 5:
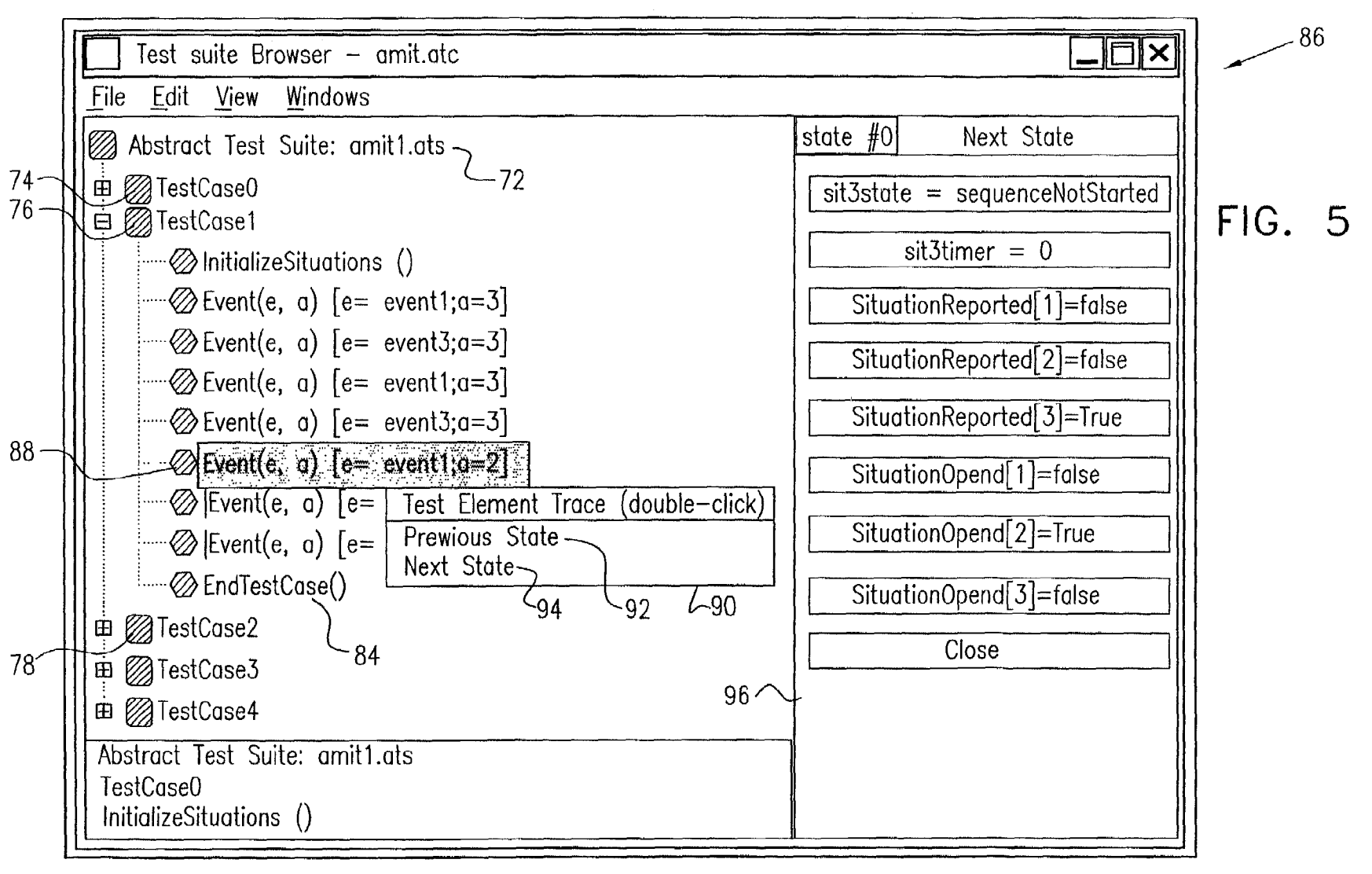

The test cases include not only the stimuli, data 82, but also the expected responses of the middleware system 38. Reference is now made to FIG. 5, which is a computer screen display illustrating predicted results of test cases suites in accordance with a preferred embodiment of the invention. A screen display 86 is similar to the screen display 70 (FIG. 4), except now the test case 76 has been expanded. Data 88 of the test case 76 have been selected, and a pop-up menu 90 relating to the data 88 has appeared, which offers two choices, previous state 92 and next state 94. When one of these choices is selected, a trace of the behavioral model code is performed. In the screen display 86, the next state 94 was selected, and a panel 96 indicates the predicted state of the middleware system 38 after it has been stimulated with the data 88. Although not shown in the panel 96, in some embodiments variables which have changed as a result of the stimulation by the data 88 are highlighted for the convenience of the user.

If the previous state 92 had been chosen, the panel 96 would have shown the predicted state of the model immediately prior to stimulation of the middleware system 38 using the data 88.

Validation of Test Cases.

Reference is again made to FIG. 1, FIG. 2, and FIG. 4. By loading the validation engine 34 with the data 82, and preloading SAMIT with both the program created in Listing 10 and the data 82, the design of SAMIT can be tested using the test case 78. Completing all the test cases of the test case suite 72, and test case suites (not shown in FIG. 4) that correspond to the other test case suites 26 (FIG. 1) in conjunction with their corresponding test programs 20, effectively tests the entire middleware application.

The use of an automatic test generator and test execution engine according to the invention achieves full test coverage of the middleware system being validated at a fraction of the current resources needed for a conventional test program.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art which would occur to persons skilled in the art upon reading the foregoing description.

Computer Program Listings.

---
Listing 1
---

```
<amit>
    <event name="event1">
        <eventAttribute name="percentage"
        type="number" />
    </event>
</amit>
```

---
Listing 2
---

```
<amit>
    <lifespan name="life1">
        <initiator>
            <startup />
        </initiator>
        <terminator>
```

-continued

Listing 2

```
        <expirationInterval timeInterval="2000" />
      </terminator>
    </lifespan>
</amit>
```

Listing 3

```
<amit>
    <lifespan name="life2">
        <initiator>
            <eventInitiator event="event1"
                where="percentage=50" />
        </initiator>
        <terminator>
            <eventTerminator event="event2" where=" " />
        </terminator>
    </lifespan>
</amit>
```

Listing 4

```
<amit>
    <situation internal="false" lifespan="life2"
    name="sitSimple1">
        <operator>
          <report detectionMode="deferred"
            where="event1.percentage=event2.percentage"/>
        </operator>
        <situationAttribute expression="detectionTime"
            name="detect" type="number" />
    </situation>
</amit>
```

Listing 5

```
<amit>
    <situation lifespan="life1" name="sitNot1">
        <operator>
          <not>
            <operandNot event="event1"
                threshold="percentage=75" />
          </not>
        </operator>
    <situationAttribute expression="detectionTime"
        name="detect" type="number" />
    </situation>
</amit>
```

Listing 6

```
<amit>
    <situation lifespan="life3" name="sitAtmost">
        <operator>
          <atmost detectionMode="deferred" quantity="2"
            where="init.percentage<event3.percentage &
            event3.percentage <term.percentage">
            <operandAtmost event="event3" />
          </atmost>
        </operator>
    <situationAttribute expression="detectionTime"
```

-continued

Listing 6

```
        name="detect" type="number" />
    </situation>
</amit>
```

Listing 7

```
<amit>
    <situation lifespan="life4" name="sitSeq1">
        <operator>
          <sequence detectionMode="deferred"
            where="init.percentage=event1.percentage">
            <operandSequence event="event1" />
            <operandSequence event="event3" />
          </sequence>
        </operator>
    <situationAttribute expression =
        "detectionTime"
        name="detect" type="number" />
    </situation>
</amit>
```

Listing 8 (see Computer Program Listing Appendix)

Listing 9

TestCase0
MakeNotOperatorSituation(startup, shorttimeinterval, Aalways, no_iq,no_tq,event1, constant_eq)
Result=OK
MakeSimpleSituation(event1, event2, delayed, constant_iq, equal_tiq)
Result=OK
MakeCountSituation(startup, event3, immediate, no_iq, equal_tiq, event3, complex_eitq, atleast, 1)
Result=SamitSyntaxError3 (this is because the initiator is startup, which cannot be qualified, and thus equal_tiq is a bad piece of syntax)
MakeBinaryOperatorSituation(event1, longtimeinterval, delayed, constant_iq, no_tq, event1, equal_eiq, event3, no_eq, sequence)
Result=OK
CloseModelFiles( )

Listing 10

```
<amit>
    <event name="event1">
        <eventAttribute name="percentage" type="number" />
    </event>
    <event name="event2">
        <eventAttribute name="percentage" type="number" />
    </event>
    <event name="event3">
        <eventAttribute name="percentage" type="number" />
    </event>
    <lifespan name="life1">
        <initiator>
            <startup />
        </initiator>
        <terminator>
            <expirationInterval timeInterval="2000" terminationType="terminate" />
        </terminator>
    </lifespan>
    <lifespan name="life2">
```

Listing 10

```
        <initiator>
            <eventInitiator event="event1"
                where="percentage=50" />
        </initiator>
        <terminator>
            <eventTerminator event="event2" />
        </terminator>
    </lifespan>
    <lifespan name="life3">
        <initiator>
            <eventInitiator event="event2" as="init" />
        </initiator>
        <terminator>
            <eventTerminator as="term" event="event3"
                where="percentage=75" />
        </terminator>
    </lifespan>
    <lifespan name="life4">
        <initiator>
            <eventInitiator as="init" event="event1"
                where="percentage=65" />
        </initiator>
       -<terminator>
            <expirationInterval timeInterval="4000" />
        </terminator>
    </lifespan>
    <situation lifespan="life1" name="sitNot1">
        <operator>
            <not>
                <operandNot event="event1" thresh-
                    old="percentage=75" />
            </not>
        </operator>
        <situationAttribute expression="detectionTime"
            name="detect" type="number" />
    </situation>
    <situation lifespan="life2" name="sitSimple1">
        <operator>
            <report detectionMode="deffered"
                where="event1.percentage=event2.percentage" />
        </operator>
        <situationAttribute expression="detectionTime"
            name="detect" type="number" />
    </situation>
    <situation lifespan="life3" name="sitAtmost">
        <operator>
            <atmost detectionMode="deferred" quantity="2"
                where="init.percentage<event3.percentage &
                event3.percentage<term.percentage">
                <operandAtmost event="event3" />
            </atmost>
        </operator>
        <situationAttribute expression="detectionTime"
            name="detect" type="number" />
    </situation>
    <situation lifespan="life4" name="sitSeq1">
        <operator>
            <sequence detectionMode="deferred"
                where="init.percentage=event1.percentage">
                <operandSequence event="event1" />
                <operandSequence event="event3" />
            </sequence>
        </operator>
        <situationAttribute expression="detectionTime"
            name="detect" type="number" />
    </situation>
</amit>
```

Listing 11

```
Type startup_t : enum {startup};
Type real_event_t : enum {event1, event2, event3};
Type time_pass_t : enum {time_pass};
Type general_event_t : union {startup_t, real_event_t,
time_pass_t };
Type attribute_t : 0..3;
Const MAXSIT : 3;
Type sit_t : 1..MAXSIT;
Const LONGTIME : 4;
Const SHORTTIME : 2;
Const ATLEASTPARAM : 2;
Const MAXCOUNT : 3;
Type timer_t : 0..LONGTIME;
Type NotState_t : enum {notseennotopevent, seennotopevent
};
Type SeqState_t:enum{sequenceNotStarted, seqSeenFirst,
seqSeenSecond };
Type CountState_t : 0..MAXCOUNT;
Type AllState_t : enum {seenNone, seenFirstOnly, seen-
SecondOnly, seenBoth };
Var SituationOpened : array [sit_t] of Boolean;
Var SituationReported : array [sit_t] of Boolean;
/* Variables and constants for situation 1
Not event1 with a constant attribute,
started by startup
terminated by shortimeinterval
*/
Const SIT1CONST : 1;
Var sit1timer : timer_t;
Var sit1state : NotState_t;
/* Variables and constants for situation 2
simple event,
started by event1 with a constant attribute,
terminated by event2 with the same attribute
*/
Const SIT2CONST : 2;
/* Variables and constants for situation 3
Sequence started by started by event1 with a constant at-
tribute
terminated by longtimeinterval
sequence of event1 with equal attribute to initiator then
event3 with no qualifications
*/
Const SIT3CONST : 3;
Var sit3timer : timer_t;
Var sit3state : SeqState_t;
/* Behavioral procedure for situation 1 */
Procedure Situation1(e: general_event_t; attribute : at-
tribute_t);
Const SITNUM : 1;
begin
    if SituationOpened [SITNUM]
    then
        sit1timer := sit1timer – 1;
        if sit1timer = 0
        then
            SituationOpened[SITNUM] := FALSE;
            if sit1state = notseennotopevent
            then
                SituationReported[SITNUM] := TRUE;
            endif;
            sit1state := notseennotopevent;
        endif;
    endif;
switch e
case event1:
    if SituationOpened[SITNUM]
        & attribute = SIT1CONST
        /* encoding the threshold clause */
    then
        sit1state := seennotopevent;
    endif;
    break;
case event2:
    break;
case event3:
    break;
case startup:
    SituationOpened[SITNUM] := TRUE;
```

Listing 11 (continued)

```
            sit1timer := SHORTTIME;
            sit1state := notseennotopevent;
        case time_pass:
            break;
    endswitch;
end;
/* Behavioral procedure for situation 2 */
Procedure Situation2 (e: general_event_t; attribute : at-
    tribute_t);
Const SITNUM : 2;
begin
    switch e
        case event1:
            if attribute = SIT2CONST
            then
                SituationOpened[SITNUM] := TRUE;
            endif;
            break;
        case event2:
            if SituationOpened[SITNUM] & attribute = SIT2CONST
            then
                SituationOpened[SITNUM] := FALSE;
                SituationReported[SITNUM] := TRUE;
            endif;
            break;
            break;
        case event3:
            break;
        case startup:
            break;
        case time_pass:
            break;
    endswitch;
end;
/* Behavioral procedure for situation 3 */
Procedure Situation3 (e: general_event_t; attribute : at-
    tribute_t);
Const SITNUM : 3;
begin
    if SituationOpened [SITNUM]
    then
        sit3timer := sit3timer − 1;
        if sit3timer = 0
        then /* close the situation */
            SituationOpened[SITNUM] := FALSE;
            if sit3state = seqSeenSecond
            then
                SituationReported[SITNUM] := TRUE;
            endif;
            sit3state := sequenceNotStarted;
        endif;
    endif;
    switch e
        case event1:
            if SituationOpened[SITNUM]
                & attribute = SIT3CONST
                & sit3state = sequenceNotStarted
            then
                sit3state := seqSeenFirst;
            endif;
            if !SituationOpened[SITNUM]
                & attribute = SIT3CONST
            then
                /* open the situation and start the timer */
                sit3state := sequenceNotStarted;
                SituationOpened[SITNUM] := TRUE;
                sit3timer := LONGTIME;
            endif;
            break;
        case event2:
            break;
        case event3:
            if SituationOpened[SITNUM]
                & sit3state = segSeenFirst
            then
                sit3state := seqSeenSecond;
            endif;
            break;
        case startup:
            SituationOpened[SITNUM] := FALSE;
            sit3timer := 0;
            sit3state := sequenceNotStarted;
        case time_pass:
            break;
    endswitch;
end;
Ruleset e: real_event_t ; a : attribute _t
do
    Rule "Event(e, a)"
        TRUE
        ==>
        Begin
            clear SituationReported;
            Situation1(e,a);
            Situation2(e,a);
            Situation3(e,a);
        End;
    End;
    Rule "TimePasses( )"
        TRUE
        ==>
        Begin
            clear SituationReported;
            Situation1(time_pass, 0);
            Situation2(time_pass, 0);
            Situation3(time_pass, 0);
        End;
    TC_StartTestCase "InitializeSituations( )"
    begin
        clear SituationReported;
        Situation1(startup, 0);
        Situation2(startup, 0);
        Situation3(startup, 0);
    end;
TC_EndTestCase "EndTestCase( )"
forall s:sit_t do !SituationOpened[s] endforall;
CC_State_Projection TRUE On SituationReported;
CC_State_Projection TRUE On SituationOpened;.
```

Listings L1–L7, and L10 are in XML format. Listing 9 is in a slightly modified XML format. Listing 8 and Listing 11 are written in an extension of the well-known Murphi language. Details of the extension are disclosed in copending application Ser. No. 09/847,309, filed May 3, 2001, which is of common assignee herewith, and herein incorporated by reference.

The invention claimed is:

1. A recursive computer-implemented model-based test generation method for validating a middleware application, comprising the steps of:
   generating a model comprising an abstract program in accordance with specifications of said middleware application;
   performing a first translation of said model into a set of test programs for programming said middleware application, said test programs comprising meta-data that are acceptable input for said middleware application;
   performing a second translation of said model into a set of behavioral models that describe behavior of said middleware application responsively to an application of said meta-data thereto;
   generating a set of test cases for each of said test programs according to said behavioral models, said test cases comprising test case data and predicted results;
   executing said test programs using said test case data of said test cases therein to cause a stimulation of said middleware application;

observing actual results produced by said stimulation of said middleware application; and determining validity of said middleware application by comparing said actual results with said predicted results.

2. The method according to claim 1, wherein said step of performing said second translation of said abstract program further comprises automatically generating a coverage criterion for said test cases.

3. The method according to claim 1, wherein said meta-data is expressed in a first language, and said behavioral models are expressed in a second language.

4. The method according to claim 1, wherein said specifications comprise an event definition.

5. The method according to claim 1, wherein said specifications comprise a lifespan definition.

6. The method according to claim 1, wherein said specifications comprise a situation definition.

7. The method according to claim 1, wherein said step of performing a first translation is performed using a translation table.

8. A computer software product for recursive model-based test generation to validate a middleware applications, including a computer-readable medium in which computer program instructions are stored, which instructions, when read by a computer, cause the computer to:

generate a model comprising an abstract program in accordance with specifications of said middleware application;

perform a first translation of said model into a set of test programs for programming said middleware application, said test programs comprising meta-data that are acceptable input for said middleware application;

perform a second translation of said model into a set of behavioral models that describe behavior of said middleware application responsively to an application of said meta-data thereto;

generate a set of test cases for each of said test programs according to said behavioral models, said test cases comprising test case data and predicted results;

execute said test programs using said test case data of said test cases therein to cause a stimulation of said middleware application;

observe actual results produced by stimulation of said middleware application; and determine validity of said middleware application by comparing said actual results with said predicted results.

9. The computer software product according to claim 8, wherein said computer is further instructed to automatically generate a coverage criterion for said test cases.

10. The computer software product according to claim 8, wherein said step of performing said second translation of said abstract program further comprises automatically generating a coverage criterion for said test cases.

11. The computer software product according to claim 8, wherein said meta-data is expressed in a first language, and said behavioral models are expressed in a second language.

12. The computer software product according to claim 8, wherein said specifications comprise an event definition.

13. The computer software product according to claim 8, wherein said specifications comprise a lifespan definition.

14. The computer software product according to claim 8, wherein said specifications comprise a situation definition.

15. The computer software product according to claim 8, wherein said computer is further instructed to perform said first translation using a translation table.

16. A recursive computer-implemented model-based test generation method for validating a middleware application, comprising the steps of:

using a test generator a first time to generate a first model comprising an abstract program in accordance with specifications of said middleware application;

performing a first translation of said first model into a set of test programs for programming said middleware application, said test programs comprising meta-data that are acceptable input for said middleware application;

performing a second translation of said first model into a set of second models that describe behavior of said middleware application responsively to an application of said meta-data thereto;

using said test generator a second time to generate a set of test cases for each of said test programs according to said second models, said test cases comprising test case data and predicted results;

executing said test programs using said test case data of said test cases therein to cause a stimulation of said middleware application;

observing actual results produced by said stimulation of said middleware application; and determining validity of said middleware application by comparing said actual results with said predicted results.

17. The method according to claim 16, wherein said step of performing said second translation of said abstract program further comprises automatically generating a coverage criterion for said test cases.

18. The method according to claim 16, wherein said meta-data is expressed in a first language, and said second models are expressed in a second language.

19. The method according to claim 16, wherein said specifications comprise an event definition.

20. The method according to claim 16, wherein said specifications comprise a lifespan definition.

21. The method according to claim 16, wherein said specifications comprise a situation definition.

22. The method according to claim 16, wherein said step of performing a first translation is performed using a translation table.

23. A computer software product for recursive model-based test generation to validate a middleware application, including a computer-readable medium in which computer program instructions are stored, which instructions, when read by a computer, cause the computer to:

execute a test generator a first time to generate a first model comprising an abstract program in accordance with specifications of said middleware application;

perform a first translation of said first model into a set of test programs for programming said middleware application, said test programs comprising meta-data that are acceptable input for said middleware application;

perform a second translation of said first model into a set of second models that describe behavior of said middleware application responsively to an application of said meta-data thereto;

execute said test generator a second time to generate a set of test cases for each of said test programs according to said second models, said test cases comprising test case data and predicted results;

execute said test programs using said test case data of said test cases therein to cause a stimulation of said middleware application;

observe actual results produced by said stimulation of said middleware application; and determine validity of said middleware application by comparing said actual results with said predicted results.

24. The computer software product according to claim 23, wherein said computer is further instructed to automatically generate a coverage criterion for said test cases.

25. The computer software product according to claim 23, wherein said step of performing said second translation of said abstract program further comprises automatically generating a coverage criterion for said test cases.

26. The computer software product according to claim 23, wherein said meta-data is expressed in a first language, and said second models are expressed in a second language.

27. The computer software product according to claim 23, wherein said specifications comprise an event definition.

28. The computer software product according to claim 23, wherein said specifications comprise a lifespan definition.

29. The computer software product according to claim 23, wherein said specifications comprise a situation definition.

30. The computer software product according to claim 23, wherein said computer is further instructed to perform said first translation using a translation table.

31. Apparatus for recursive model-based test generation to validate a middleware application, comprising:

a test generator operative a first time to generate a first model comprising an abstract program in accordance with specifications of said middleware application;

a processor operative to perform a first translation of said first model into a set of test programs for programming said middleware application, said test programs comprising meta-data that are acceptable input for said middleware application, said processor operative to perform a second translation of said first model into a set of second models that describe behavior of said middleware application responsively to an application of said meta-data thereto, wherein said test generator is operative to generate a set of test cases for each of said test programs according to said second models, said test cases comprising test case data and predicted results;

an execution engine operative to cause a stimulation of said middleware application, wherein said test programs are a first input of said execution engine, and said test case data are a second input of said execution engine, and wherein actual results are produced by said stimulation of said middleware application; and a validation engine for determining validity of said middleware application by comparing said actual results with said predicted results.

32. The apparatus according to claim 31, wherein said processor automatically generates a coverage criterion for said test cases.

33. The apparatus according to claim 31, wherein said meta-data is expressed in a first language, and said second models are expressed in a second language.

34. The apparatus according to claim 31, wherein said specifications comprise an event definition.

35. The apparatus according to claim 31, wherein said specifications comprise a lifespan definition.

36. The apparatus according to claim 31, wherein said specifications comprise a situation definition.

* * * * *